United States Patent
Tipper et al.

(10) Patent No.: US 6,295,903 B1
(45) Date of Patent: Oct. 2, 2001

(54) SCREWDRIVER AND METHOD FOR MAKING SAME

(75) Inventors: J. David Tipper; Gary Scott, both of Sheffield (GB)

(73) Assignee: The Stanley Works, New Britain, CT (US)

(*) Notice: Subject to any disclaimer, the term of this patent is extended or adjusted under 35 U.S.C. 154(b) by 0 days.

(21) Appl. No.: 09/532,306

(22) Filed: Mar. 22, 2000

(51) Int. Cl.⁷ .................................................. B25G 1/01
(52) U.S. Cl. ..................... 81/489; 81/177.1; 264/177.1; 16/116 R
(58) Field of Search ................... 81/489, 177.1; 264/605, 171.1, 171.27, 173.11, DIG. 57; 16/116 R, DIG. 19

(56) References Cited

U.S. PATENT DOCUMENTS

| | | |
|---|---|---|
| 3,093,172 * | 6/1963 | Reed, II . |
| 3,189,069 * | 6/1965 | Stowell . |
| 4,660,832 | 4/1987 | Shomo . |
| 4,949,457 | 8/1990 | Burout, III . |
| 4,969,231 | 11/1990 | Mader et al. . |
| 5,390,572 | 2/1995 | Gakhar et al. . |
| 5,640,741 | 6/1997 | Yano . |
| 5,740,586 * | 4/1998 | Gomas . |
| 5,781,963 * | 7/1998 | Maru et al. . |
| 5,819,594 | 10/1998 | Sjovall . |
| 5,839,163 | 11/1998 | Hellmann . |
| 5,964,009 | 10/1999 | Hoepfl et al. . |

FOREIGN PATENT DOCUMENTS 2274615   8/1994   (GB) .

* cited by examiner

Primary Examiner—Timothy V. Eley
Assistant Examiner—Willie Berry, Jr.
(74) Attorney, Agent, or Firm—Pillsbury Winthrop LLP

(57) ABSTRACT

A torque applying hand tool, and a method for making the same, is provided which includes a shank having a tool end adapted to applying a torque to a member engaged thereby and a handle engaging end portion opposite the tool end. An innermost handle layer made of a relatively hard and tenaciously adhering thermoplastic material is molded to form a first molded part. The handle end portion of the shank is fixed within the first molded part. An intermediate inner handle layer of a relatively hard thermoplastic material is molded on the first molded part in fixed torque applying relation thereto to form a second molded part. An intermediate outer handle layer of a relatively hard thermoplastic material is molded onto the second molded part in fixed torque applying relation thereto to form a third molded part. An outermost handle layer of elastomeric material is molded on the third molded part in fixed torque applying relation thereto to form a handle, having an exterior elastomeric gripping surface capable of transmitting torque to the shank through the third, second and first molded parts.

18 Claims, 5 Drawing Sheets

SCREWDRIVER AND METHOD FOR MAKING SAME

FIELD OF THE INVENTION

The present invention relates to torque applying hand tools having handles made with plastic materials and more particularly to a torque applying hand tool having a multi-layer plastic handle and a method for making such a handle.

BACKGROUND OF THE INVENTION

Conventional torque applying tool handles must meet certain basic needs. The handle must bond well to a steel component, such as the shank of a screwdriver. It must be strong enough to withstand the forces and torque applied to the tool. At the same time, the handle must also provide appropriate ergonomics so that a user of the tool may comfortably and securely hold the tool. To achieve a balance between the strength, bonding and comfort of use, tool handles made from two or three shots of plastic are available on the market. Each shot represents a single step in the molding process and is a complete or partial layer forming part of the handle. For example, several varieties of tool handles with two or three shots of material are commercially available. One such type of two shot tool handle has an inner layer of polypropylene and an outer layer of thermoplastic rubber to provide a gripping surface. Another type has a polypropylene layer of one color and a second polypropylene layer of another color. The two layers provide a color pattern and are used, for example, to provide information such as manufacturer brand name.

A commercial three shot handle has an inner polypropylene layer, a second polypropylene layer which covers over the inner layer and an outer thermoplastic rubber layer which covers most of the second layer and provides a gripping surface. For use in a chisel, a three shot handle has been made with two shots of cellulose acetate butyrate and a shot of urethane to provide a gripping surface. The urethane covers a portion of the cellulose acetate butyrate shots, but a portion of those layers remains visible.

Additionally, a three shot handle with two polypropylene layers and a thermoplastic rubber shot is available. The second polypropylene shot is partially visible and the thermoplastic rubber shot provides a gripping surface over a portion of the outside of the handle. In producing the molded plastic handles of the prior art, a determining factor in the cycle time is related to the amount of cooling time necessary before the cycle can be completed by removing the molded structure from the mold.

Based upon the prior art described above, it appears that a saturation point as to the maximum number of layers that is cost-effective has been reached. Nevertheless, there is always a need for cost-effectiveness in the production of commercial products such as the torque applying tools to which the present invention is directed.

SUMMARY OF THE INVENTION

It is an object of the present invention to fulfill the need described above. In accordance with the principles of the present invention, this objective is obtained by providing a method of making a torque applying hand tool which includes molding an inner handle layer of relatively hard thermoplastic material within a die cavity to form a first molded part, molding an intermediate inner handle layer of thermoplastic material on the first molded part within a die cavity to form a second molded part, molding an intermediate outer handle layer of thermoplastic material on the second molded part within a die cavity to form a third molded part, and molding an outer handle layer of elastomeric material on the third molded part within a die cavity to form a handle having an exterior elastomeric gripping surface capable of transmitting torque applied thereto through the third, second and first molded parts to a tool shank fixed within the inner handle layer.

The object of the present invention is also achieved by providing a torque applying hand tool comprising a shank having a tool end constructed and arranged to apply a torque to a member engaged thereby and a handle engaging end portion opposite the tool end. An innermost handle layer of a relatively hard and tenaciously adhering thermoplastic material is molded to form a first molded part. The handle end portion of the shank is fixed within the first molded part. An intermediate inner handle layer of a relatively hard thermoplastic material is molded on the first molded part in fixed torque applying relation thereto to form a second molded part. An intermediate outer handle layer of a relatively hard thermoplastic material is molded on the second molded part in fixed torque applying relation thereto to form a third molded part. An outermost handle layer of elastomeric material is molded on the third molded part in fixed torque applying relation thereto to form a handle on the shank having an exterior elastomeric gripping surface capable of transmitting torque to the shank through the third, second and first molded parts.

Contrary to the prior art maximum number of layers, the inventors of the present invention have found that four layers can be cost-effective. By using a four shot handle, each shot contains less material than would be necessary in a two or three shot handle. Surprisingly, this allows a reduction in total cycle time, even though with one or two additional process steps existing when compared with the prior art. This time savings results in a significant cost savings, as well as an increase in the number of tools which may be produced in a given time period.

The present invention provides the further advantage that the use of four layers gives an opportunity to use a greater variety of materials. This, in turn, provides more versatility in exterior surface variation, both in terms of function and appearance. Because each layer constitutes a lesser percentage of the whole, it becomes possible to use more expensive materials in lesser amounts than was heretofore possible.

Materials such as nylon can be used to provide an increased strength over conventional polypropylene handles. However, the use of nylon can be prohibitively expensive as it costs significantly more than polypropylene. Similarly, thermoplastic elastomers provide improved gripping performance, but they are not suited to provide the bulk of the handle as they are too soft. By using four layers, these needs may be met while selecting other materials for the interior layers. Thus, according to one aspect of the present invention, nylon is used as the first layer, providing high strength at the center of the tool handle. Nylon also provides a bond with the steel shank of the tool which is superior to the bond between polypropylene and steel. However, since the amount of nylon in the tool is only on the order of 25% of the total plastic content, with much of the rest being polypropylene, the handle remains cost effective.

Multiple layers provide an additional advantage in that they allow for greater flexibility in design. According to another aspect of the present invention, each layer may have a different appearance, allowing the manufacturer to provide multiple colors or contrasting designs. This has the advantage of allowing for manufacturer's logos, or information about the tool itself, such as the type of head on a screwdriver, to be conveyed.

DETAILED DESCRIPTION OF THE PREFERRED EMBODIMENTS

A torque applying hand tool according to the present invention includes any type of hand tool which is used to apply torque. The tool end may be adapted to engage any number of types of fasteners such as Phillips head screws, slotted screws, nuts, bolts, Torx® fasteners and the like. Further, the four layer cushioned handle may be advantageously applied to other tools such as a pry bar, ratchet, wrench or the like.

Figures 10, 11:
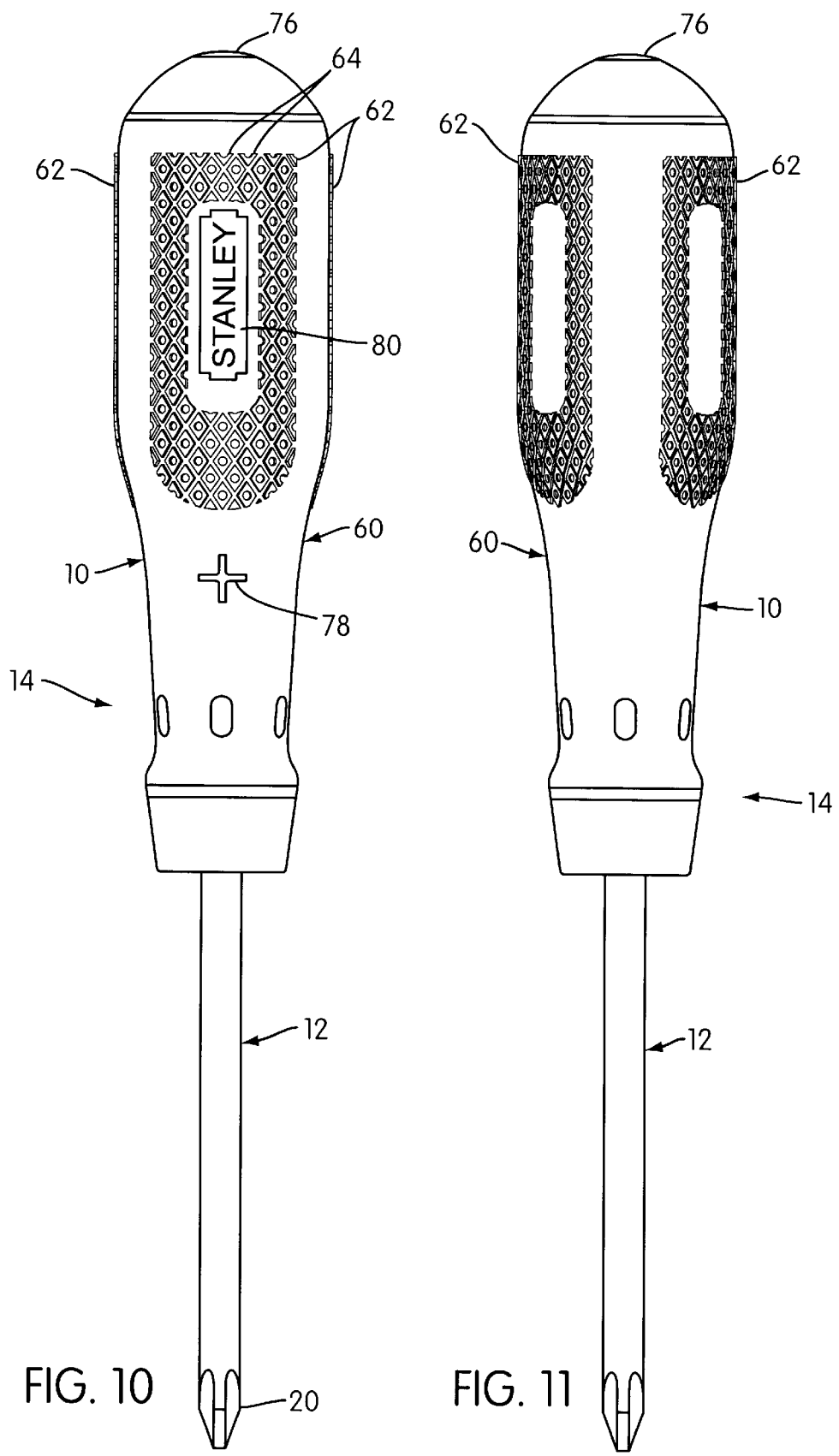
FIG. 10 is a top view of a torque applying hand tool according to the present invention.
FIG. 11 is a bottom view of a torque applying hand tool according to the present invention.

In a preferred embodiment, the torque applying hand tool is a screwdriver as shown in FIGS. 1–11. Referring to FIG. 10, a handle 10 is attached to a shank 12 forming a complete tool 14.

Figure 1:
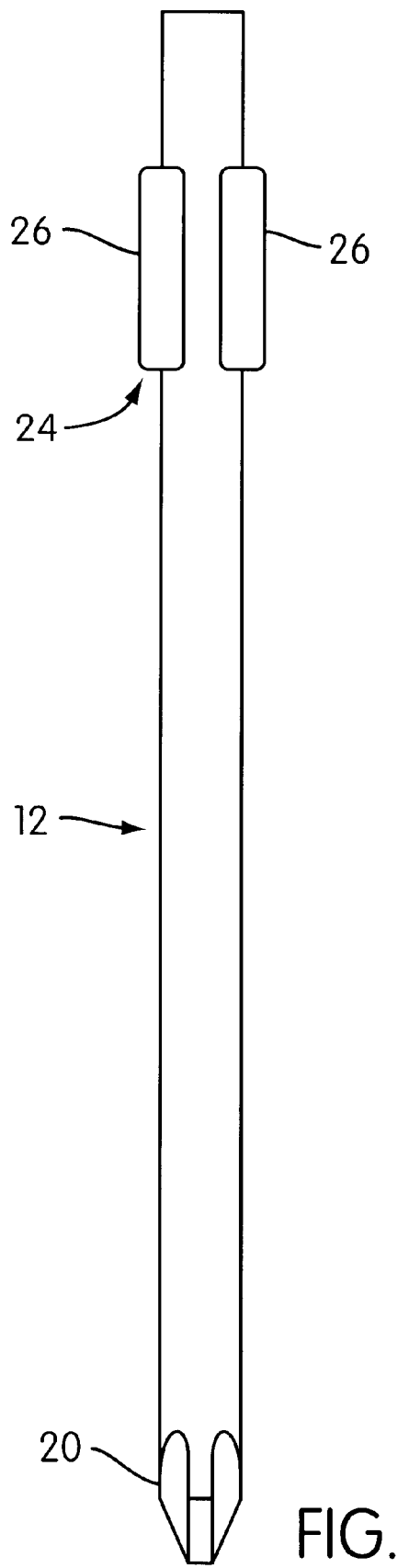
FIG. 1 is a top view of a shank for a torque applying hand tool according to the present invention.
Figure 2:
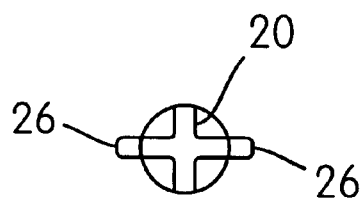
FIG. 2 is an end view of a shank for a torque applying hand tool according to the present invention.
Figure 3:
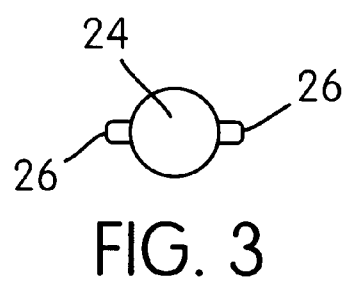
FIG. 3 is an end view of a shank for a torque applying hand tool according to the present invention, rotated 180° from the perspective of FIG. 2.

As can be seen in FIGS. 1–3, the shank 12 has a tool end 20 which engages a member (not shown) and applies a torque thereto. As noted above, the tool end 20 may be adapted to any number of applications such as screws, nuts, Torx® fasteners or the like. The opposite end of the shank has a handle engaging end portion 24, preferably including structure such as wings 26 which extend radially outward. The wings 26 act as a handle engaging structure which helps torque applied to the handle 10 to be coupled into the shank 12 so that the shank 12 may be turned. Though it is preferable that the shank 12 has wings 26, other geometries may be employed. For example, the shank 12 may have a square cross-section along the handle engaging end portion 24 such that the squared corners allow torque to be coupled into the shank 12 from the handle 10. Alternately, the handle 10 maybe secured to the shank 12 by means of an adhesive or the handle 10 may be secured by pressure fitting it to the shank 12.

Figure 4:
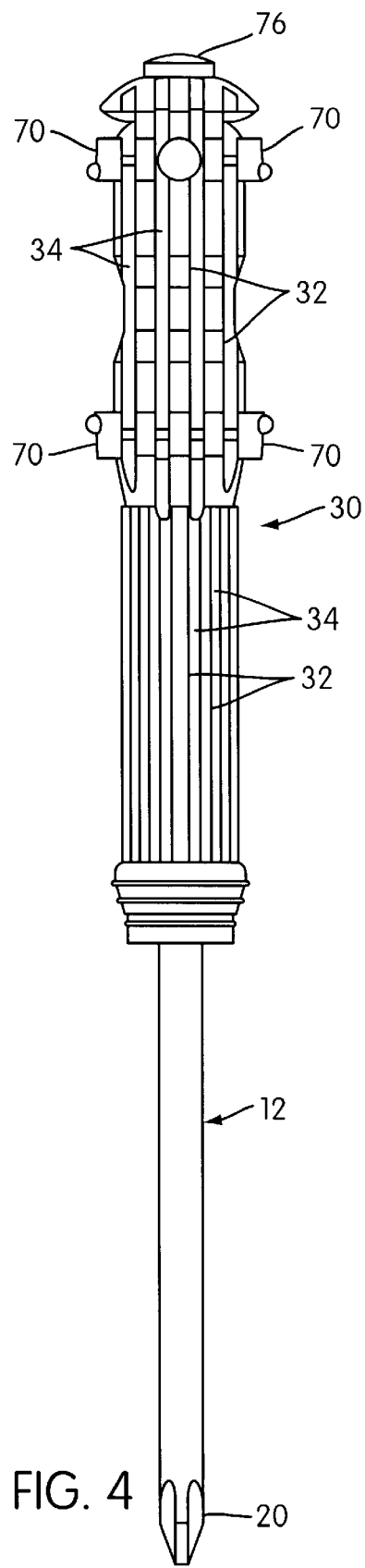
FIG. 4 is a top view of a torque applying hand tool according to the present invention, with the second, third and fourth molded parts removed.
Figure 5:
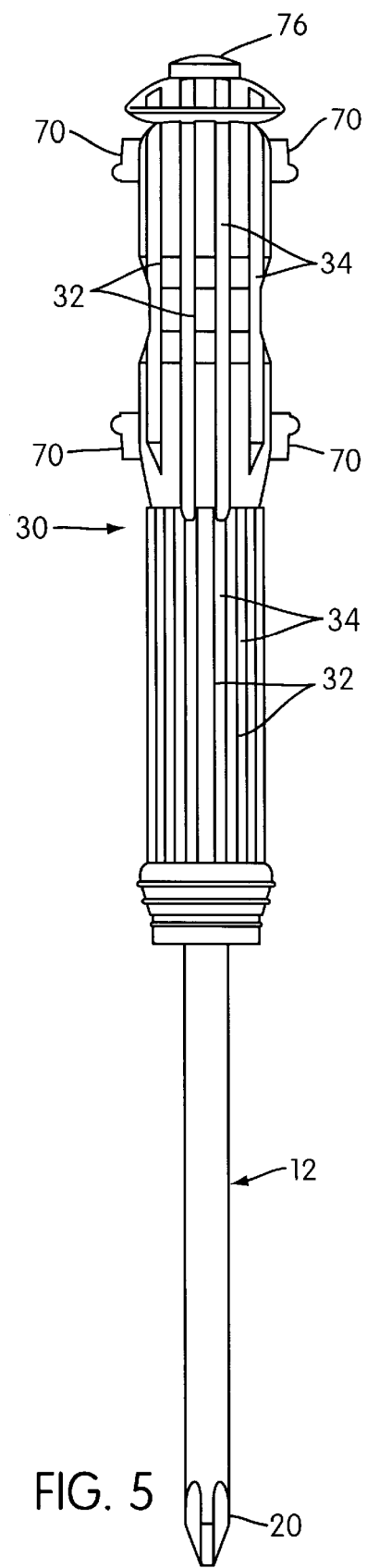
FIG. 5 is a bottom view of a torque applying hand tool according to the present invention with the second, third and fourth molded parts removed.
Figure 6:
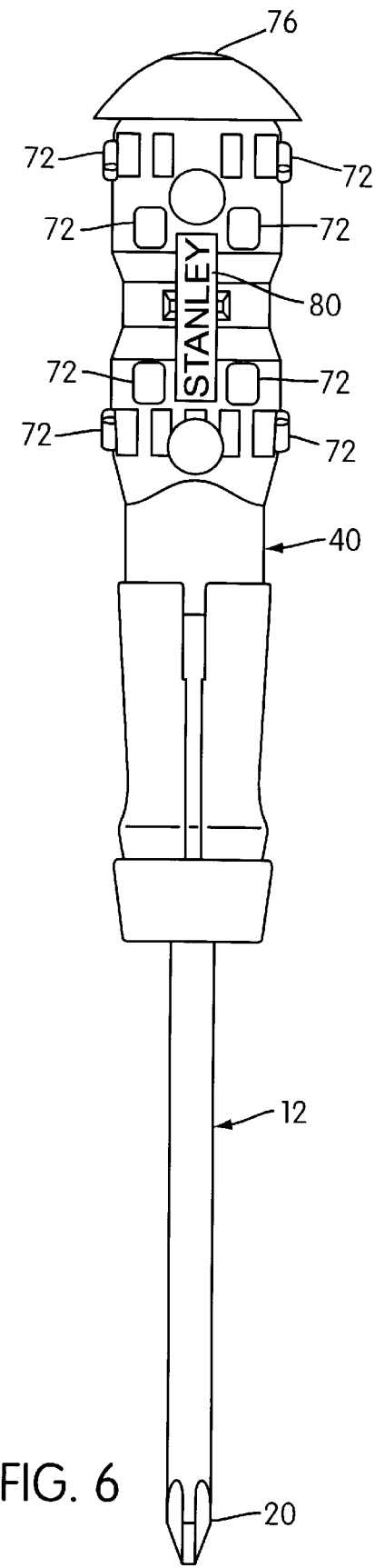
FIG. 6 is a top view of a torque applying hand tool according to the present invention, with the third and fourth molded parts removed.
Figure 7:
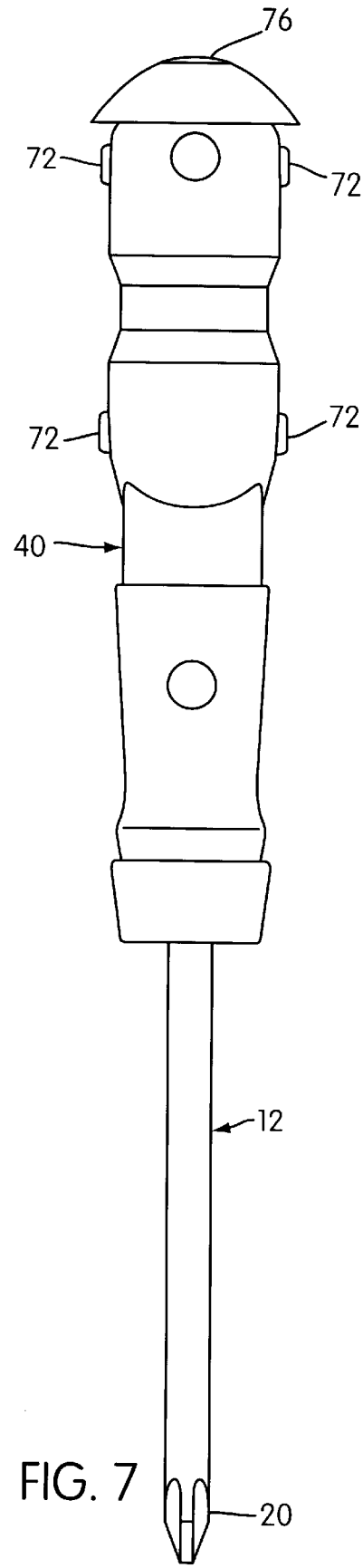
FIG. 7 is a bottom view of a torque applying hand tool according to the present invention, with the third and fourth molded parts removed.
Figures 8, 9:
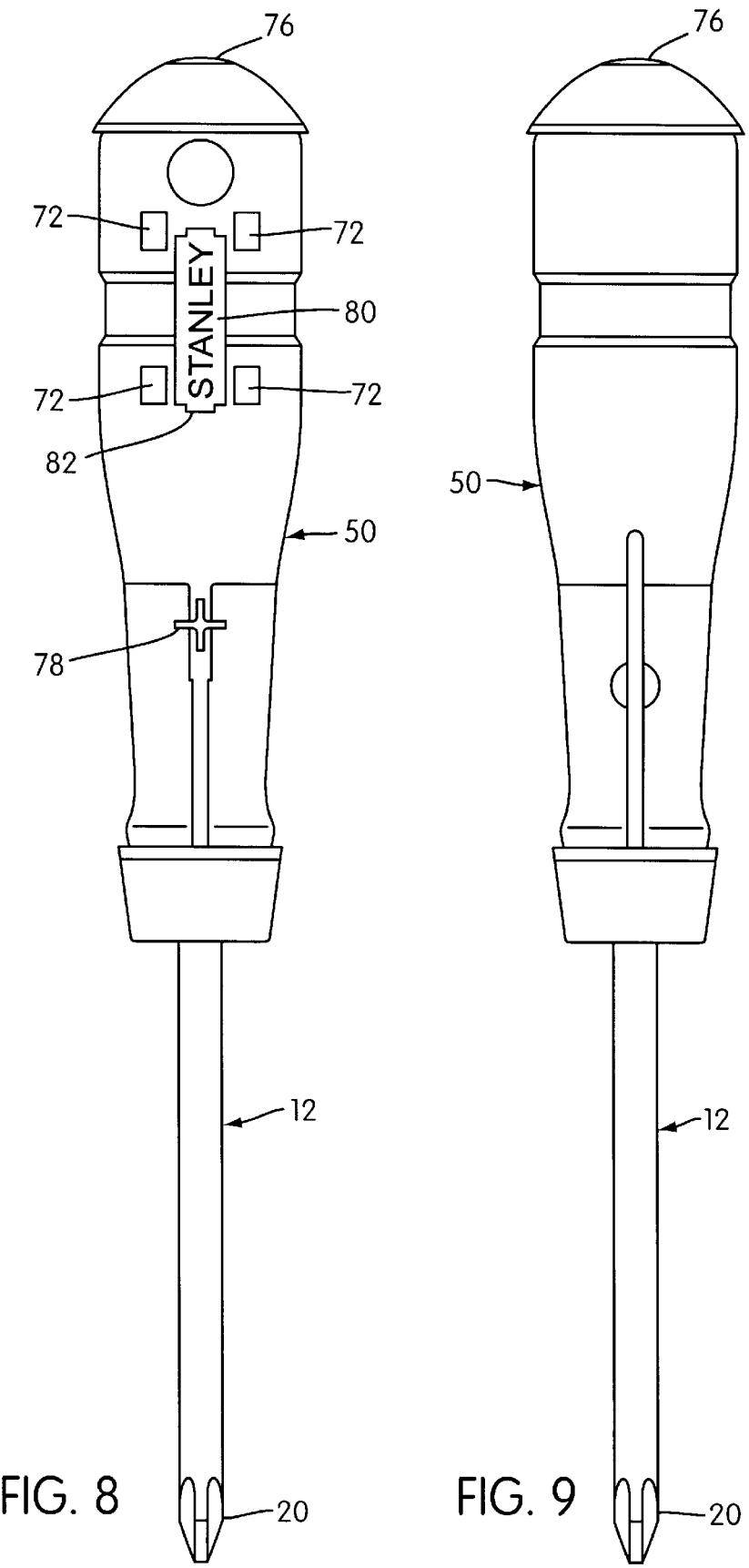
FIG. 8 is a top view of a torque applying hand tool according to the present invention, with the fourth molded part removed.
FIG. 9 is a bottom view of a torque applying hand tool according to the present invention, with the fourth molded part removed.

Referring now to FIGS. 4 and 5, the handle 10 has an innermost handle layer 30 of a relatively hard and tenaciously adhering thermoplastic material. The innermost handle layer 30 is molded, within a die cavity, onto the handle engaging end portion 24 of the shank 12 in a fixed relation such that it may apply torque to the shank 12 and forms a first molded part 30. Preferably, the first molded part 30 is made of unfilled, un-nucleated Nylon 6 which provides exceptional adherence to the shank 12 as well as exceptional mechanical strength. The first molded part 30 preferably has a series of ridges 32 which define generally longitudinally extending grooves 34. The grooves 34 and ridges 32 provide for enhanced mechanical torque transmission between the first molded part 30 and overlying parts 40, 50, 60. While the ridges 32 and grooves 34 are shown in FIGS. 4 and 5 as extending in a longitudinal direction, this arrangement is not necessary and any suitable pattern which provides for interlocking between layers may be employed. A further advantage of providing the grooves 34 and ridges 32 is that the first molded part 30 has an increased surface area when compared to a cylindrical solid of the same volume, providing for faster cooling of the thermoplastic material during production of the tool 14.

An intermediate inner handle layer 40 of a relatively hard thermoplastic material is molded onto the first molded part 30. The intermediate inner handle layer 40 of material is molded, within a die cavity, in fixed torque applying relation to the first molded part 30 and forms a second molded part 40. Preferably, the second molded part 40 is a polypropylene material such as Targor 2240. The second molded part 40 substantially fills in the grooves 34 of the first molded part 30, forming a strong mechanical bond between the two parts 30, 40 and providing for good torque transfer between the two parts 30, 40.

An intermediate outer handle layer 50 of a relatively hard thermoplastic material is molded, within a die cavity, onto the second molded part 40, in fixed torque applying relation to the second molded part 40 and forms a third molded part 50. As with the second molded part 40, the third molded part 50 is preferably a polypropylene such as Targor 2240.

An outermost handle layer 60 of an elastomeric material is molded, within a die cavity, onto the third molded part 50 in fixed torque applying relation and forms a fourth molded part 60. Together the first 30, second 40, third 50 and fourth 60 molded parts form a handle 10 which has an elastomeric exterior gripping surface 62 which is capable of transmitting manually applied torque to the shank 12 through the third 50, second 40 and first 30 molded parts. Preferably the gripping surface 62 is textured with raised elements 64, to provide improved gripping.

As noted above, the first molded part 30 is preferably Nylon, while the second molded part 40 is polypropylene. These two materials do not form a strong chemical bond during molding, which, in part, leads to the use of an exterior configuration of the first molded part 30 which provides ridges 32 and longitudinally extending grooves 34. This configuration, as noted above, provides a mechanical bond between the two parts 30, 40 since there is not a strong chemical bond therebetween. Further, the first molded part has portions 70 which extend outward to improve the mechanical bond between the parts 30, 40.

In contrast, the second 40 and third 50 molded parts are each polypropylene so a chemical bond is formed between these two parts. As may be seen in FIGS. 6 and 7, the second molded part, similarly to the first molded part, has portions 72 which extend outward, providing for some degree of interference fit bonding between the two parts 40, 50, however, the chemical bonding between the parts 40, 50 further increases the strength of the interconnection. In addition, the parts preferably have cross sections that are substantially triangular with rounded corners. The substantially triangular shape of the cross sections provides additional torque performance for the handle by preventing layers from slipping around underlying layers.

The outer layer 60 is, as noted above, an elastomeric material. Preferably, it is a thermoplastic elastomer, such as a thermoplastic rubber, more specifically, it is preferably Evoprene 969 which is available from Laporte Alphagary Ltd. Evoprene is a synthetic rubber which is polypropylene based. As a result, the outermost layer 60 and the intermediate outer layer 50 form a strong chemical bond during the molding process so that the third molded part 50 and the fourth molded part 60 are strongly connected. Though it is not shown in the figures, additional strength in resisting slippage between the third 50 and fourth 60 molded parts is provided by the irregular shape of the parts 50, 60. Additional strength is provided by the protruding portions 70, 72, 74 of the underlying first 30, second 40 and third 50 molded parts respectively.

The four layered handle 10 allows the tool 14 to have additional useful features. If, as is best seen in FIGS. 10 and 11, each layer 30, 40, 50, 60 forms a portion of the exterior surface of the handle 10, each layer 30, 40, 50, 60 may be used to convey information about the tool's configuration to a user. For example, each layer 30, 40, 50, 60 may be distinctive in color or texture. A tool 14 having this configuration may have, for example, a portion 76 of the exterior surface provided by the innermost, Nylon layer 30. This portion 76 indicates, through color coding, the configuration of the tool end 20. For example, if the tool end coding portion 76 is red, the tool end 20 is adapted to driving a Phillips or slotted head screw. If the tool end coding portion 76 is blue, the tool end 20 is configured for posi-drive, while if it is green, the tool end 20 is configured to engage a square member, such as a nut.

A second portion of the exterior surface 78 may also provide an indication of the configuration of the tool end 20 as seen in FIG. 10. This portion 78 preferably provides a pictographic representation of the tool end 20 so that a user may easily see what type of tool it is. This is particularly useful when a single color of tool end coding portion 76 represents more than one tool configuration as in the example of red, above. That is, if red indicates a screwdriver that is either Phillips or slotted, the second portion will clearly show which of the two the tool actually is.

The multiple colors may also serve to provide additional information which the manufacturer may want to convey. For example, an indication 80 as to the manufacturer's name can be provided. Given the use of multiple colors, this indication may be made quite clear without any additional coloring step after the tool 14 is complete. For example, the second molded part 40 may be black and include the raised lettering which indicates the manufacturer's name 80. The third molded part 50 may then be yellow, and provide an outlining portion 82 which increases the visibility of the name 80. Moreover, the ability to use multiple colors allows for the provision of color combinations which are easily recognized by consumers. For example, consumers associate the combination of black and yellow with quality Stanley tools, so a tool 14 according to the present invention preferably incorporates a yellow layer and a black layer (for example, the intermediate inner 40 and intermediate outer 50 layer) which each provide a portion of the exterior surface and are visible to the consumer.

Though the handle 10 is preferably molded directly onto a shank 12, the handle 10 may alternately be molded as a separate unit which may then be pressed onto a shank 12.

Preferably, multiple shanks 12 are processed at one time. For example, in an efficient process for making multiple tools, a group of eight shanks 12 are placed simultaneously into a first mold die having eight die cavities. Eight first molded parts 30 are simultaneously molded onto the eight shanks 12. The eight shanks 12 are then moved from the first mold to a second mold where the second molded part 40 is added. Preferably, as the first set of eight partially complete tools 14 is moved to the second mold, a second set of shanks 12 is inserted into the first mold. When the second molded part 40 is complete, each group of tools 14 is moved, the first group moving to a third mold as the second group is moved to the second mold. A third group is placed within the first mold. Thus, as the first group has its third molded part 50 added, the second group has its second molded part 40 added and the third group receives its first molded part 30. This process is repeated to produce the fourth molded part 60 on the first group. After this step, the first group is complete and the following groups of tools 14 are partially complete. Preferably, the process is operated on a continuing basis so that at any given time a new group of tools 14 is beginning and a group is being completed.

The process is preferably designed so that each stage takes approximately the same amount of time. This may require that the step time is extended to the longest of the four steps. It is preferable, therefore, that each layer 30, 40, 50, 60 be designed to have a cooling time approximately equal to each of the other layers 30, 40, 50, 60.

For example, each step may be approximately 50 seconds, so that to complete all four steps requires 200 seconds. Following the method described above, this means that a set of four molds, each having eight die cavities, may be used to produce eight complete tools 14 in each cycle. Since a new group of eight is begun as each group of eight is removed, the process is continuous so that every 50 seconds eight tools 14 are completed.

It will be appreciated that the above descriptions are intended only to serve as examples, and that many other embodiments are possible within the spirit and the scope of the present invention.

What is claimed:

1. A torque applying hand tool, comprising:
    a shank having a tool end constructed and arranged to apply a torque to a torque-receiving member engaged thereby and a handle engaging end portion opposite the tool end;
    an innermost handle layer of a relatively hard thermoplastic material molded to form a first molded part;
    the handle-engaging end portion of said shank being fixed within said first molded part;
    an intermediate inner handle layer of a relatively hard thermoplastic material molded on said first molded part in fixed torque applying relation thereto to form a second molded part;
    an intermediate outer handle layer of a relatively hard thermoplastic material molded on said second molded part in fixed torque applying relation thereto to form a third molded part; and an outermost handle layer of elastomeric material molded on said third molded part in fixed torque applying relation thereto to form a handle on said shank having an exterior elastomeric gripping surface capable of transmitting torque to said shank through said third, second and first molded parts.

2. A torque applying hand tool according to claim 1 wherein said innermost layer and said intermediate inner layer are formed of different materials which do not chemically bond during molding, said innermost layer being molded with an irregular exterior configuration which is filled by the material of the intermediate inner handle layer when molded thereon to provide for mechanical torque transmission between the inner and intermediate inner layers.

3. A torque applying hand tool according to claim 2 wherein said intermediate inner and outer handle layers are formed of materials which chemically bond during molding.

4. A torque applying hand tool according to claim 3 wherein said intermediate outer layer and said outermost layer are formed of materials which chemically bond during molding.

5. A torque applying hand tool according to claim 4 wherein the exterior surface of said handle is primarily provided by said outermost layer with the innermost layer and each intermediate layer providing a portion of the exterior surface.

6. A torque applying hand tool according to claim 5 wherein the exterior surface portion provided by each layer is distinctive in color or texture.

7. A torque applying hand tool according to claim 2 wherein the innermost layer is formed of nylon.

8. A torque applying hand tool according to claim 7 wherein the intermediate layers are formed of polypropylene.

9. A torque applying hand tool according to claim 8 wherein the outermost layer is formed of elastomeric polypropylene.

10. A torque applying hand tool according to claim 9 wherein said tool end is a screwdriver head.

11. A method of making a handle for a torque applying hand tool comprising:

molding an inner handle layer of relatively hard thermoplastic material within a die cavity to form a first molded part;

molding an intermediate inner handle layer of thermoplastic material on said first molded part within a die cavity to form a second molded part;

molding an intermediate outer handle layer of thermoplastic material on said second molded part within a die cavity to form a third molded part; and molding an outer handle layer of elastomeric material on said third molded part within a die cavity to form a handle having an exterior elastomeric gripping surface capable of transmitting torque applied thereto through said third, second and first molded parts to a tool shank fixed within said inner handle layer.

12. A method of making a torque applying hand tool in accordance with claim 11 wherein the inner handle layer is molded on one end portion of a tool shank within said die cavity.

13. A method as defined in claim 12 wherein the molding of each of said handle layers is such that each layer provides a portion of an entire exterior surface of said handle of which said exterior elastomeric gripping surface is a major portion.

14. A method as defined in claim 13 wherein the exterior surface portion provided by each layer is distinctive in color or texture.

15. A method as defined in claim 14 wherein the innermost layer is formed of nylon.

16. A method as defined in claim 15 wherein the intermediate layers are formed of polypropylene.

17. A method as defined in claim 16 wherein the outermost layer is formed of elastomeric polypropylene.

18. A method as defined in claim 17 wherein said tool end is a screwdriver head.

* * * * *